(12) United States Patent
Nishimura et al.

(10) Patent No.: US 7,129,004 B2
(45) Date of Patent: Oct. 31, 2006

(54) SEPARATOR FOR ZINC/BROMINE SECONDARY BATTERIES AND PRODUCTION PROCESS THEREOF

(75) Inventors: Yoshifumi Nishimura, Moriyama (JP); Yoko Saito, Moriyama (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 523 days.

(21) Appl. No.: 10/283,254

(22) Filed: Oct. 30, 2002

(65) Prior Publication Data

US 2003/0113633 A1 Jun. 19, 2003

Related U.S. Application Data

(63) Continuation-in-part of application No. 09/833,927, filed on Apr. 13, 2001, now abandoned.

(30) Foreign Application Priority Data

May 22, 2000 (JP) .............................. 2000-149596

(51) Int. Cl.
*H01M 2/16* (2006.01)
(52) U.S. Cl. ..................................... 429/252
(58) Field of Classification Search ..................... None
See application file for complete search history.

(56) References Cited

FOREIGN PATENT DOCUMENTS

| JP | 6217945 A | 1/1987 |
|----|-----------|--------|
| JP | 1157071 A | 6/1989 |
| JP | 527233 B2 | 4/1993 |
| JP | 9231957 A | 9/1997 |
| JP | 11-162441 * | 6/1999 |

* cited by examiner

*Primary Examiner*—Jonathan Crepeau
(74) *Attorney, Agent, or Firm*—Birch, Stewart, Kolasch & Birch, LLP

(57) ABSTRACT

A separator for use in zinc/bromine secondary batteries comprising a polyethylene having an overall viscosity average molecular weight of not less than 350,000 and not more than 2,000,000 containing not less than 10 wt. % and not more than 80 wt. % of a polyethylene having a molecular weight of 1,000,000 or more and fine particulate silica, wherein the ratio by weight of polyethylene/fine particulate silica is more than 1 and less than 1.5, and the ratio of the number of silicon atoms (Si) to the number of carbon atoms (C), Si/C, exposed on the surfaces of said separator excluding cross-sectioned surfaces thereof is not less than 0.01 and less than 0.2 as determined by X-ray photoelectron spectroscopy (XPS).

4 Claims, 4 Drawing Sheets

SEPARATOR FOR ZINC/BROMINE SECONDARY BATTERIES AND PRODUCTION PROCESS THEREOF

This application is a continuation-in-part of application Ser. No. 09/833,927 filed on Apr. 13, 2001 now abandoned, and application Ser. No. 09/833,927 claims priority to application Ser. No(s). 2000-149596 filed in Japan on May 22, 2000 under 35 U.S.C. § 119, the entire contents of both these applications are hereby incorporated by reference.

TECHNICAL FIELD

The present invention relates to a separator for zinc/bromine secondary batteries which have been developed to be used for electric power storage systems and electric vehicles and a process for producing the same.

BACKGROUND ART

In general, a separator to be used in zinc/bromine secondary batteries should have the following characteristics:
1) having an ionic conductivity, a low resistivity, and functions of reducing self-discharges with zinc and bromine which occur at both electrode compartments;
2) comprising a membrane having a stability which prevents the bromine dispersion from generating at an anode and does not cause deterioration of the membrane due to the strongly oxidizing bromine;
3) comprising a membrane insusceptible to swelling and flexure and capable of lengthen the life of the batteries;
4) having a lower production cost.

In the current art, it is considered that separators having the aforementioned characteristics which have been put in use include ion-exchange films, fluorinated resin porous films, and polyolefin porous films. Among them, separators made of polyethylenes and fine particulate silica as disclosed in JP-B-5-27233 are cheap and excellent in resistance to oxidation.

However, the separators as disclosed in the JP-B-5-27233 have a thermal resistance problem that the step of attaching an electrode frame to the separator by injection molding causes cracking of the separator due to heating, as described in JP-A-62-17945. Moreover, these separators suffer from cracking of films, i.e., deficiency in resistance to stress-cracking after they have been used for a long period of time as those in zinc/bromine secondary batteries.

In order to overcome these problems, an attempt has been proposed to incorporate ultra-high molecular weight polyethylenes, as disclosed in JP-A-9-231957. However, this art cannot be said sufficiently satisfactory in electrical properties though it could increase the thermal resistance and the resistance to stress-cracking.

Moreover, when polyolefin based fine porous films containing primarily polyolefins and silica are used, the separators have usually insufficiently low bromine permeability to make it impossible to achieve sufficient coulomb (Ah) efficiency. To overcome this difficulty, a technique of rendering the ratio of the number of silicon atoms (Si) to the number of carbon atoms (C) which are exposed on the surfaces including the separator's wall surfaces, i.e., Si/C, not less than 0.2 as determined with an X-ray photoelectron spectroscopy (XPS) has been proposed, as described in JP-A-1-157071.

However, these separators are disadvantageously deteriorated drastically during the use thereof with a great reduction in coulombic efficiency resulting in a short life of the cells, though they have certainly a high initial coulombic efficiency.

DISCLOSURE OF THE INVENTION

An object of the present invention is to provide a separator for use in zinc/bromine secondary batteries which does not have the aforementioned problems and a process for producing the same.

The present inventors have made an extensive research to solve the aforementioned problems. As a result, we have found that a separator for use in zinc/bromine secondary batteries being excellent in retaining initial coulombic efficiency, thermal resistance, resistance to stress-cracking, and electric properties can be produced by controlling the ratio of the number of silicon atoms (Si) to the number of carbon atoms (C), Si/C, with a specific proportion of ultra-high molecular weight polyethylenes in the whole composition, and a specific ratio of polyethylenes, fine particulate silica and plasticizer.

Practically, the present invention lies in providing:

(1) a separator for use in zinc/bromine secondary batteries comprising a polyethylene having an overall viscosity average molecular weight of not less than 350,000 and not more than 2,000,000 containing not less than 10 wt. % and not more than 80 wt. % of a polyethylene having a molecular weight of 1,000,000 or more and fine particulate inorganic materials, wherein the ratio by weight of polyethylene/fine particulate silica is more than 1 and less than 1.5, and the ratio of the number of silicon atoms (Si) to the number of carbon atoms (C), Si/C, exposed on the surfaces of said separator excluding cross-sectioned surfaces (cut planes) is not less than 0.01 and less than 0.2 as determined by X-ray photoelectron spectroscopy (XPS); and (2) a process for producing a separator for use in zinc/bromine secondary batteries as described in above (1) comprising forming a sheet by knead-extrusion molding a composition comprising polyethylene, fine particulate silica and a plasticizer at the ratio by weight of polyethylene/fine particulate silica of more than 1 and less than 1.5, and at the ratio by weight of plasticizer/fine particulate silica of not less than 2.51 and not more than 3.5, and then extracting said plasticizer.

BEST MODE FOR CARRYING OUT THE INVENTION

Figure 1:
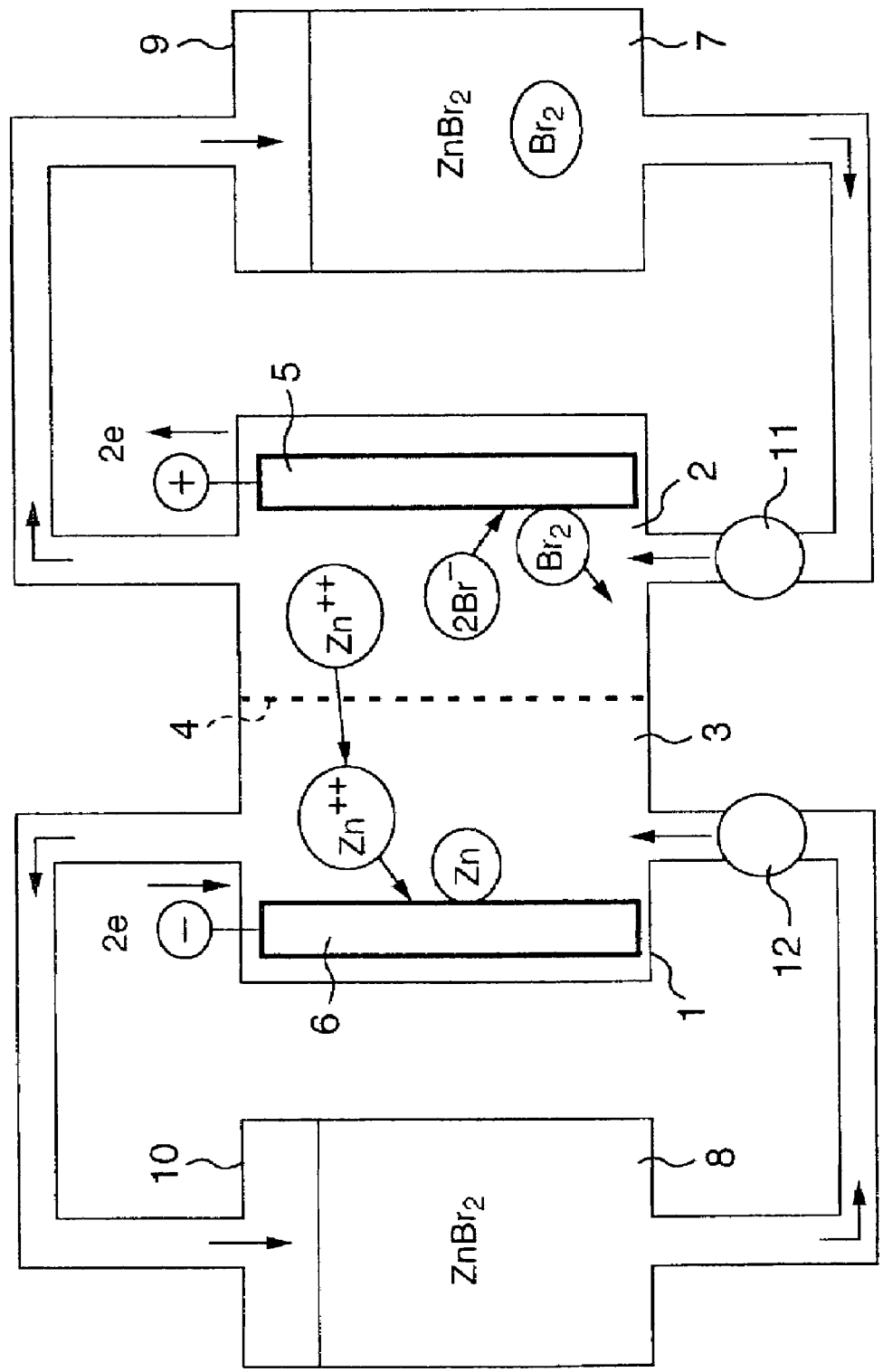
FIG. 1 shows an arrangement of a single cell of zinc/bromine secondary batteries for measuring a coulombic efficiency. In the FIG. 1 designates a single cell, 2 a positive electrode compartment, 3 a negative electrode compartment, 4 a separator, 5 a positive electrode, 6 a negative electrode, 7 a positive electrolyte, 8 a negative electrolyte, 9 a positive electrolyte storage, 10 a negative electrolyte storage, and 11 and 12 designate pumps.

The separator for use in zinc/bromine secondary batteries of the present invention comprises a polyethylene, which has an overall viscosity average molecular weight of not less than 350,000 and not more than 2,000,000, preferably 500,000 to 1,500,000. If the viscosity average molecular weight is less than 350,000, the separator has a poor mechanical strength and a poor resistance to stress-cracking. If the viscosity average molecular weight is higher than 2,000,000, the composition may be inferior in process capability causing melt fracture during extrusion and making it impossible to produce a sheet having an accurate thickness.

The polyethylene to be used in the separator for zinc/bromine secondary batteries of the present invention need contain not less than 10 wt. % and not more than 80 wt. %, preferably not less than 20 wt. % and not more than 60 wt. % of polyethylene having a molecular weight of 1,000,000 or more. The content (wt. %) of polyethylene having a molecular weight of 1,000,000 or more as used here can be obtained from an integration curve of GPC (gel permeation chromatography) measurements with the weight. If the content of polyethylene having a molecular weight of 1,000,000 or more is less than 10 wt. %, the composition may be inferior in resistance to stress-cracking, while if it is more than 80 wt. %, the composition may be inferior in process capability causing melt fracture during extrusion and the separator may have a less accurate film thickness.

The polyethylenes which can be used in the present invention include well-known homopolymer and copolymer polyethylene resins of high density polyethylenes, low density polyethylenes, linear low density polyethylenes. Particularly, those having a density of 0.9 g/cm$^3$ to 0.99 g/cm$^3$ are preferred. More preferably, the use of high density polyethylene resins having a density of 0.93 g/cm$^3$ to 0.98 g/cm$^3$ provides films having a good thermal resistance. The polyethylene resins may be a mixture of the polyethylenes as described above, or a mixture of said polyethylenes with other polyolefin resins. Moreover, to the polyethylene resins may be added anti-oxidants, ultraviolet radiation absorbing agents, slipping agents, anti-blocking agents, colorants, flame retardants, and the like, if necessary, so long as the additives do not adversely affect the products of the present invention.

The present invention requires that the ratio by weight of polyethylene/fine particulate silica is more than 1 and less than 1.5, preferably more than 1.05 and less than 1.20 and that the ratio of the number of silicon atoms (Si) to the number of carbon atoms (C), Si/C, exposed on the surfaces of the separator excluding cross-sectioned surfaces (cut planes) is not less than 0.01 and less than 0.2, preferably not less than 0.05 and less than 0.18, as determined by X-ray photoelectron spectroscopy (XPS). At the ratio of less than 0.01 by XPS, the resulting films become inferior in electric properties, while at the ratio of not less than 0.2, they become poor in retaining the initial coulombic efficiency. If the ratio by weight of polyethylene/fine particulate silica is over 1.5, the coulombic efficiency become insufficient, while if it is less than 1, the mechanical strength becomes inferior.

In the present invention, the proportion of the area where silica can be observed to be present on the surface of a membrane by a scanning electron microscope is referred to as surface silica ratio. This is based on observations in the areas located deeper in the membrane than those effected by XPS. When the silica ratio in these areas becomes higher, there is a higher tendency that silica release occurs, or the retaining of initial coulombic efficiency is insufficient.

In the present invention, the silica ratio is preferably not more than 0.33, more preferably not more than 0.3. With the silica ratio being over 0.33, the retaining of initial coulombic efficiency tends to be poor.

The porosity of the separator of the present invention is preferably in a range of 30 to 80%, more preferably 50% to 60%. The porosity lower than 30% may deteriorate electric properties, while that higher than 80% may deteriorate mechanical strength. There is a tendency that good coulombic efficiency can be achieved with a porosity of 50 to 60%.

The thickness of the separator of the present invention is preferably 0.2 mm to 1.4 mm, more preferably 0.4 mm to 1.0 mm. If the thickness is higher than 1.4 mm, inferior electric properties may be brought about, while if it is lower than 0.2 mm, inferior mechanical strength may be caused.

The process for producing a separator for use in zinc/bromine secondary batteries of the present invention comprises forming a sheet by knead-extrusion molding a composition comprising polyethylene, fine particulate silica and a plasticizer at the ratio by weight of polyethylene/fine particulate silica of more than 1 and less than 1.5, and at the ratio by weight of plasticizer/fine particulate silica of not less than 2.51 and not more than 3.5, and then extracting said plasticizer.

First, in order to achieve a polyethylene having an overall viscosity average molecular weight of not less than 350,000 and not more than 2,000,000 containing not less than 10 wt. % and not more than 80 wt. % of polyethylene having a molecular weight of 1,000,000 or more, for example, an ultra-high molecular weight polyethylene having a viscosity average molecular weight of 1,500,000 or more and a polyethylene resin having a viscosity average molecular weight of 400,000 or less are mixed. When such polyethylene resins are mixed, the presence of the ultra-high molecular weight polyethylenes can be recognized as a rising up of the elongational viscosity on the long time side obtained by measuring the elongational viscosity.

Next, the polyethylenes, fine particulate silica, and plasticizer are mixed to produce a composition having a ratio by weight of polyethylenes/fine particulate silica of more than 1 and less than 1.5, preferably more than 1.05 and less than 1.20 and a ratio by weight of plasticizer/fine particulate silica of not less than 2.51 to not higher than 3.5. Without using such a composition, such conditions that the ratio of the number of silicon atoms (Si) to the number of carbon atoms (C), Si/C, exposed on the surfaces of said separator excluding cut planes is not less than 0.01 and less than 0.2 as determined by X-ray photoelectron spectroscopy (XPS) can not be achieved.

The plasticizer to be used in the present invention need be liquid and inert during melting and molding. Examples of the plasticizer include organic substances such as phthalate esters, e.g. diethyl phthalate (DEP), dibutyl phthalate (DBP), dioctyl phthalate (DnOP), bis(2-ethylhexyl) phthalate (DOP), diisodecyl phthalate (DIDP), and phosphate esters, and liquid paraffins, and the like. Among them, DBP, DnOP, DOP, DTDP and mixtures thereof are particularly preferred.

The fine particulate silica includes hydrophilic wet or dry silicas, and hydrophobic silica produced by surface-treating these hydrophilic silicas. The use of hydrophilic, fine particulate silica is preferred to achieve good electric properties.

Mixing these three components, i.e., a polyethylene, fine particulate silica and a plasticizer, can sufficiently be effected by ordinary mixing technique with a mixing machine such as Haenschel mixer, V-blender, Pro-shear mixer and ribbon blender. The mixture is kneaded by a melt-kneading apparatus such as extruder, kneader or the like. The resulting kneaded materials are molded into a sheet by melt-molding with T-die. In this case, it is preferred from the standpoint of dimensional consistency to mold via a gear pump. Particularly the molding is preferably conducted by controlling the front pressure of the gear pump at a constant level from the standpoint of dimensional consistency.

Moreover, in order to cool the kneaded materials upon the melt extrusion, various processes can be used such as cooling with air, contacting with rollers controlled at a temperature 20 to 120° C. lower than the temperature of the resins extruded from T-die, or calendering into a sheet while cooling with rollers at a temperature 20 to 120° C. lower than the temperature of the resins extruded from T-die. Among them, calendering the materials into a sheet while cooling with rollers at a temperature 20 to 120° C. lower than the temperature of the resins extruded from T-die is preferred to achieve the uniformity in thickness. Rolling the materials into a sheet is preferably performed with a distance between the T-die and the contact of the sheet with the roller being in a range of 100 to 500 mm. The use of such a process for shaping allows the ratio of the number of silicon atoms (Si) to the number of carbon atoms (C) exposed on the surfaces not including the cut surfaces of the separator, Si/C, to be not less than 0.01 and less than 0.2 as determined by X-ray photoelectron spectroscopy (XPS). The temperature of extrusion from the die can be measured by an ordinary thermocouple, the tip of which is disposed in contact with the extruded resins, but not in contact with the die.

Next, the membrane produced by the process as described above is treated with a solvent to extract the plasticizer and then dried. The solvent to be used includes organic solvents such as methanol, ethanol, methyl ethyl ketone and acetone, halogenated hydrocarbons such as methylene chloride.

As described above, the separator for zinc/bromine secondary batteries of the present invention can be produced.

The present invention will be described in more detail with reference to Examples and Comparative Examples hereunder but should not be limited to those Examples. The physical properties referred to in Examples were determined by the following methods:

(1) Viscosity Average Molecular Weight (Mv) of Polyethylene

A separator, from which the silica had been extracted by a method of producing a single polyethylene film as described later, was dissolved into a solvent (decalin), and the limiting viscosity [η] was measured at 135° C., and then the Mv was calculated from the following equation:

$$[\eta]=(6.2\times10^{-4})\times Mv^{0.7}$$ (Chiang's equation)

(2) Proportion of Polyethylene Having a Molecular Weight of Not Less Than 1,000,000 included in the whole polyethylene A separator, from which the silica had been extracted by a method of producing a single polyethylene film, was dissolved in the following solvent at the following temperature. The obtained solution was filtered through a sintered filter having a pore size of 0.45 μm and the filtrate was then subjected to a measurement by GPC. The sintered filter was weighted in advance before it was used for the filtration. After the filtration, it was washed with ethanol, dried and weighed again. The gain in weight was regarded as a part of polyethylene having a molecular weight of 1,000,000 or more.

GPC measurement apparatus: WATERS 150-GPC.
Solvent: 1,2,4-Trichlorobenzene.
Concentration: 0.05% (Amount of Injection: 500 μL).
Column: Shodex GPC AT-807/S, one column. Tosoh TSK-GEL GMH6-HT, two columns.
Dissolving conditions: 160° C., 2.5 hours.
Calibration curve: A standard polystyrene samples were measured and converted into that of polyethylenes under a conversion factor of 0.43 using third order calculation.

The weight of a polyethylene having a molecular weight of 1,00,000 or more determined from GPC integration curve was combined with the above gain in weight of the filter. The combined weight was regarded as the weight of the polyethylene having a molecular weight of 1,000,000 or more. This weight was compared with the initial weight of the separator sample to obtain the proportion of the polyethylene.

(3) Density of Polyethylene (g/cm$^3$)

A film obtained by a process for producing single polyethylene film with cold press was made to contain no air therein to become transparent and then was measured for its density with density gradient pipes.

(4) Thickness of Membrane (mm)

This was measured with a micrometer.

(5) Porosity (%)

This was determined by using the following equation:

$$\text{Porosity}=(1-(0.1\times X/(Y\times Z)))\times 100$$

wherein
X: Weight of film (g/dm$^2$),
Y: Calculated by using a composition ratio which had been obtained by a method for analyzing polymer/silica composition as described later with the specific weight of membrane (g/cm$^3$), density of polyethylene, and specific weight of fine particulate silica of 1.9,
Z: Thickness of film (mm).

(6) XPS Si/C Ratio

A sample was cut into a square of 10×10 mm, immersed in methylene chloride overnight (for not less than 17 hours), taken therefrom, rinsed with fresh methylene chloride, and dried with air. Then, the sample was attached on a sample support for an XPS measurement with clips, placed in a sub-chamber which was pre-evacuated, and then placed inside the XPS apparatus. The intensity of C(1s) and Si(2p) electrons were measured to obtain the ratio of Si/C.

Apparatus: ESCA 5400 made by ULVAC PHI Co.
X-ray source: Mg Kα (non-monochromatic conventional Mg Kα)
Measured peak: Narrow Scan: C 1s, Si 2p
Pass Energy: Survey Scan; 178.9 eV
Narrow Scan; 35.75 eV
Ar ion sputter: Degree of Vacuum 5.0×10$^{-5}$ Torr
Output: 2 kV, 25 mA
Sputtering time: 1 minute.

(7) Surface Silica Ratio

Measurement by an image analyzer from SEM photographs.
SEM: S-4100 (FE-SEM) made by HITACH CO., LTD.
Acceleration voltage: 3 kV
Pre-treatment: Pt-Pd Evaporation, 0.1 Torr, 0.5 mA, 15 sec×4, W.D.: 15 mm.

The surface of film was photographed under the conditions as above with a magnitude of 5000. This photograph was taken into a computer through a CCD camera with the aperture being controlled to 0.96 to 0.98 after controlling illumination and analyzed with Quantimet 500 (tradename), an image analyzing software made by Leica Co., to calculate automatically the area of white regions in the photograph. The analysis was performed in a square of 5 cm×8 cm. A sample was measured three times and the surface silica ratio was determined based on the average of three measurements.

(8) Mechanical Properties

Mechanical properties were measured with a tensile strength tester in accordance with JIS K7127.

(9) Electric Properties

Electric resistance was measured from electric resistance in accordance with JIS C-2313.

(10) Elongation Viscosity

Elongation viscosity was measured with MELTEN Rheometer made by TOYOSEIKI Co. Ltd.

Measurement temperature range: 160 to 200° C.

Strain velocity: 0.05 to 2.0 (/ sec)

Samples for measuring elongation viscosity were manufactured as follows:

A film obtained by a process for producing single polyethylene film was placed between polyimide films, and pressed with mirror plates while heating at 200° C. to melt. The molten films were stacked, heat-pressed with a mold at 260° C. into a rod to produce a sample for measuring elongation viscosity.

(11) Process for Producing Single Polyethylene Film

A separator was immersed in alcohol, and after almost all the air was extracted, immersed in a 20% aqueous solution of caustic soda at 80° C. a whole day and night, washed with a warmed water of 60° C. and washed with tapping water a whole day and night. The film was dried in a dryer at 40° C. a whole day and night. A part of the resulting film was measured by a process for measurement of residual silica as described below to confirm that the amount of residual silica was not more than 1 wt. %.

(12) Polyethylene/Silica Composition Analysis Method

Using TG/DTA 220 made by Seiko Instruments Inc., the composition of samples was determined from an initial weight of about 10 mg and a weight after the sample was allowed to stand under flowing air at 550° C. for 60 minutes.

(13) Residual Silica Analysis Method

A separator, the weight of which had been measured, was placed in a crucible, the weight of which had been made steady-state, and allowed to stand at 900° C. for 3 hours, measured for the weight after all the polyethylenes in the crucible were completely burned to evaluate the residual silica wt. % based on the residue weight/the separator weight.

(14) Retainability of Initial Coulombic Efficiency

The coulombic efficiency is a proportion of a quantity of discharged electricity [current($I_2$)×discharging hour($h_2$)] to a quantity of charged electricity [current($T_1$)×charging hour ($h_1$)] as expressed by the following equation:

Coulombic efficiency=$(I_2 \times h_2)/(I_1 \times h_1)$

The coulombic efficiency was measured by using a single cell of a zinc/bromine secondary battery as shown in FIG. 1 with a platinum electrode having an electrode area of 400 $cm^2$ and an electrolyte composed of a solution of zinc bromide ($ZnBr_2$) of 3 mol/L, a solution of ammonium chloride of 4 mol/L, and a solution of $Br_2$ complex forming agent of 1 mol/L under the conditions of a charge and discharge current density of 20 mA/$cm^2$, a distance between the membrane and the electrode of 1 mm, a flow rate of electrolyte of 100 mL/minute, an amount of electrolyte in the positive electrode compartment and the negative electrode compartment of 500 mL, a charging hour of 4 hours, a cut-off voltage of 0.5 V, and a temperature of electrolyte at working of not lower than 25° C.

The retainability of initial coulombic efficiency is a proportion of a coulombic efficiency at the fiftieth charge and discharge cycle to a coulombic efficiency at the first charge and discharge cycle.

(15) Thermal Resistance

When twenty separators were stack-welded in a polyethylene frame by an ultrasonic welding, the proportion of separators with cracked films was referred to as thermal resistance.

(16) Resistance to Stress-cracking

When twenty separators were used for zinc/bromine secondary batteries and then removed therefrom, the proportion of separators found to have cracks was referred to as resistance to stress-cracking.

EXAMPLE 1

20 wt. % of fine particulate silica, 57 wt. % of bis(2-ethylhexyl)phthalate (DOP), 9 wt. % of an ultra-high molecular weight polyethylene having a viscosity average molecular weight of 3,000,000 and 14 wt. % of a high molecular weight polyethylene having a viscosity average molecular weight of 300,000 were mixed with a super-mixer. Using a 30 mmφ twin extruder equipped with a T-die having a width of 450 mm, the mixture was extruded at a T-die resin extrusion temperature of 220° C. At this step, the melt-extrusion was effected under a constant front pressure of a gear pump to achieve a consistent dimensional stability. The resin extruded from the T-die was calendered with rollers controlled at 140° C. into a sheet having a film thickness of 0.65 mm.

Figure 3:
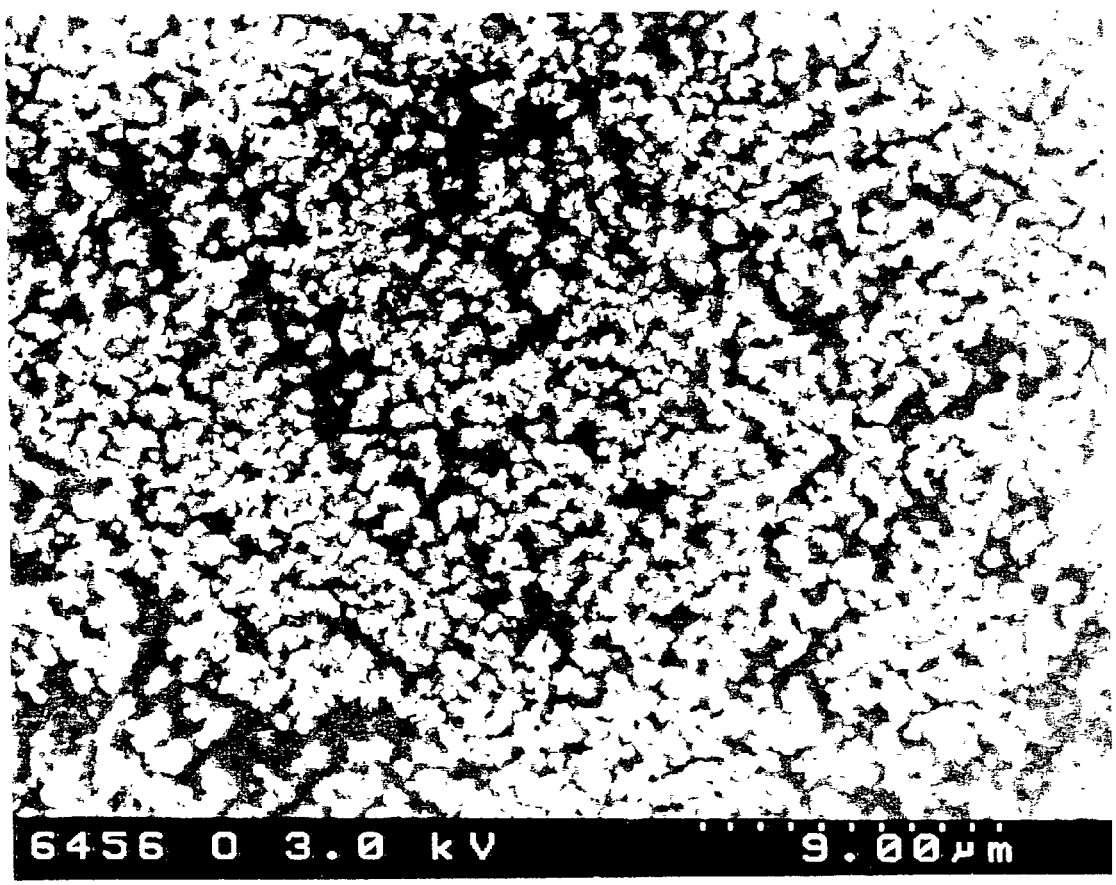
FIG. 3 is a photomicrograph of the surface of the separator of Example 1.

Shaped sheet was immersed in methylene chloride for one hour to extract the bis(2-ethylhexyl)phthalate (DOP), and then dried. The thus obtained separator had characteristics as shown in Table 1. The photograph of the surface of the separator is shown in FIG. 3. The surface silica ratio measured from the photograph is also shown in Table 1.

EXAMPLE 2

Figure 2:
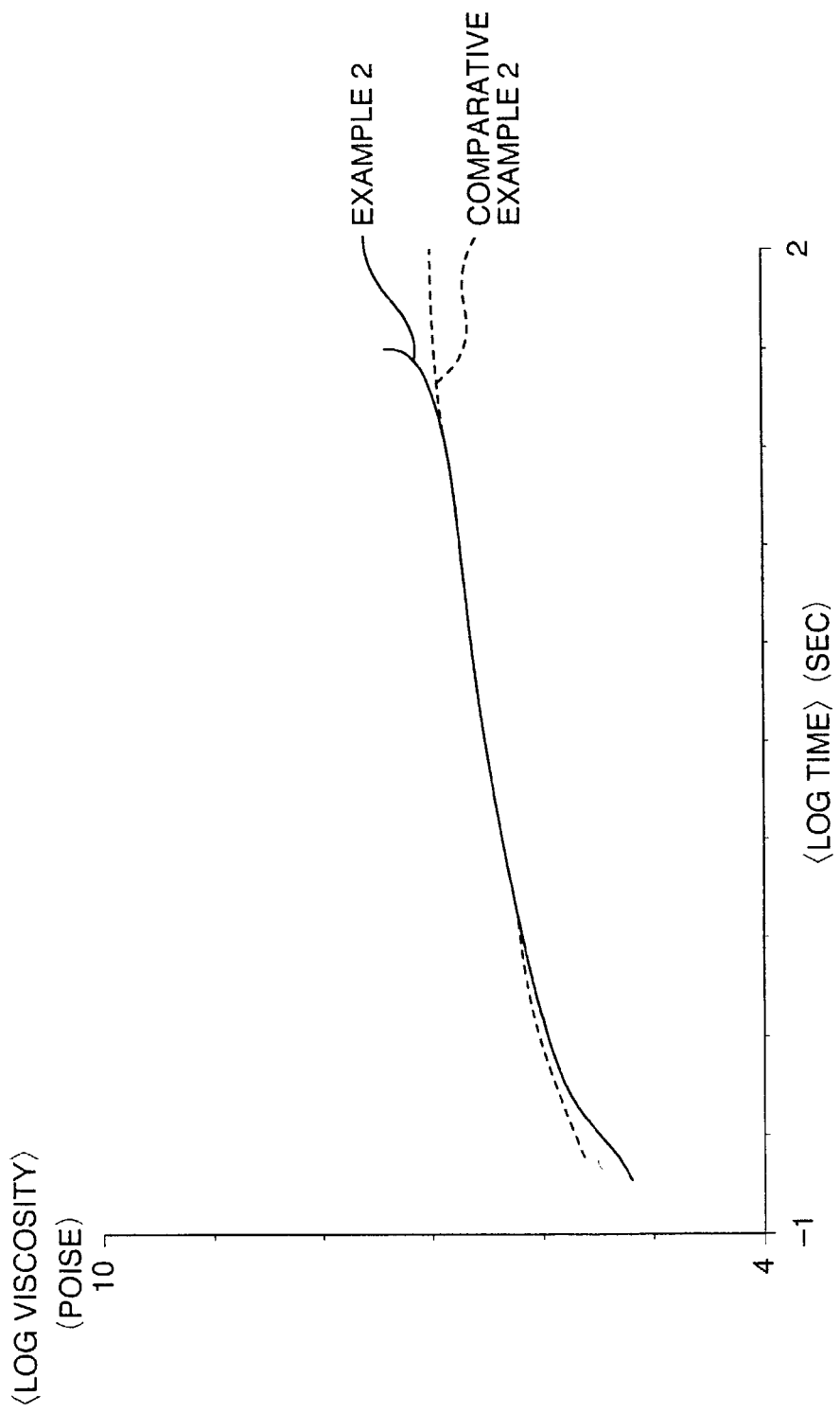
FIG. 2 shows the results of the measurement of elongational viscosity in Example 2 and Comparative Example 2.

The procedure of Example 1 was repeated, except that 1.5 wt. % of an ultra-high molecular weight polyethylene having a viscosity average molecular weight of 3,000,000 and 21.5 wt. % of a high molecular weight polyethylene having a viscosity average molecular weight of 300,000 were used to produce a separator. The characteristics of the obtained separator are shown in Table 1. A single polyethylene film was produced from the obtained separator by the process for producing a single polyethylene film and evaluated for elongation viscosity. The results are shown in FIG. 2.

EXAMPLE 3

The procedure of Example 1 was repeated, except that 21.4 wt. % of fine particulate silica and 55.6 wt. % of bis(2-ethylhexyl)phthalate (DOP) were used to produce a separator. The characteristics of the obtained separator are shown in Table 1.

EXAMPLE 4

The procedure of Example 1 was repeated, except that 21.4 wt. % of fine particulate silica, 55.6 wt. % of bis(2-ethylhexyl)phthalate (DOP), and 9 wt. % of an ultra-high molecular weight polyethylene having a viscosity average molecular weight of 2,000,000 were used to produce a separator. The characteristics of the obtained separator are shown in Table 1.

Comparative Example 1

20 wt. % of fine particulate silica and 50 wt. % of bis(2-ethylhexyl)phthalate (DOP) were mixed with a super-mixer. To the mixture, 2 wt. % of an ultra-high molecular weight polyethylene having a viscosity average molecular weight of 3,000,000 and 28 wt. % of a high molecular weight polyethylenes having a viscosity average molecular weight of 300,000 were added and mixed with a super-mixer. The procedure of Example 1 was repeated to produce a separator, except that this mixture was employed. The characteristics of the obtained separator are shown in Table 1.

Comparative Example 2

Figure 4:
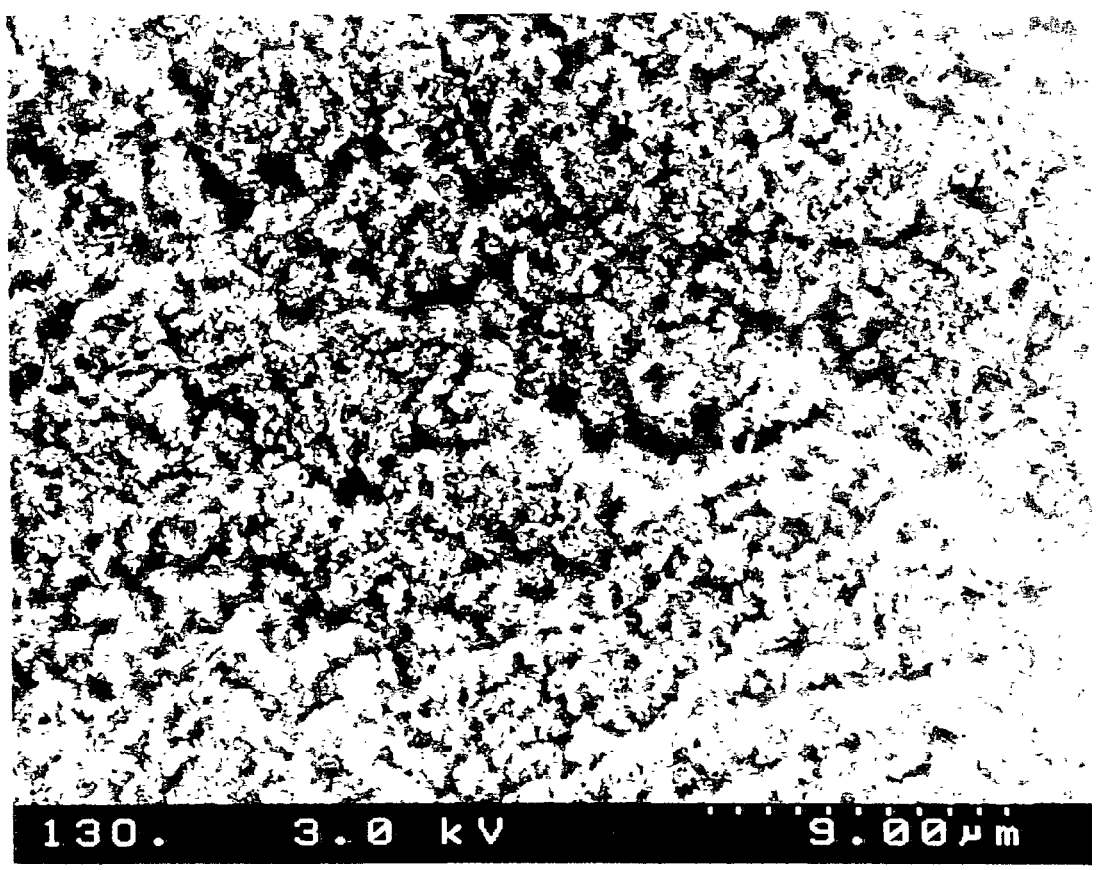
FIG. 4 is a photomicrograph of the surface of the separator of Comparative Example 2.

The procedure of Example 1 was repeated to produce a separator, except that 23 wt. % of fine particulate silica and 54 wt. % of bis(2-ethylhexyl)phthalate (DOP) were mixed with a super-mixer, and to the mixture, 23 wt. % of a high molecular weight polyethylene having a viscosity average molecular weight of 300,000 alone was added. The characteristics of the obtained separator are shown in Table 1. The elongation viscosity of the obtained separator was measured in the same manner as in Example 2. The results are shown in FIG. 2. The photograph of the surface of this separator is shown in FIG. 4. The surface silica ratio measured from the photograph is also shown in Table 1.

TABLE 1

| Item | Unit | Ex. 1 | Ex. 2 | Ex. 3 | Ex. 4 | Comp. Ex. 1 | Comp. Ex. 2 |
|---|---|---|---|---|---|---|---|
| Film thickness | mm | 0.6 | 0.6 | 0.6 | 0.6 | 0.6 | 0.6 |
| Viscosity average molecular weight of polyethylene | $\times 10^4$ | 95 | 40 | 95 | 60 | 40 | 30 |
| Proportion of polyethylene having a molecular weight of not less than 1,000,000 | wt. % | 40 | 15 | 40 | 30 | 15 | 8 |
| Ratio of polyethylene/fine particulate silica | | 1.15 | 1.15 | 1.07 | 1.15 | 1.5 | 1.0 |
| Ratio of plasticizer/fine particulate silica | | 2.85 | 2.85 | 2.6 | 2.6 | 2.5 | 2.35 |
| XPS Si/C ratio | | 0.08 | 0.08 | 0.15 | 0.18 | 0.22 | 0.5 |
| Surface silica ratio | | 0.24 | 0.24 | | | 0.35 | 0.35 |
| Thermal resistance | % | 0 | 0 | 0 | 0 | 0 | 25 |
| Resistance to stress-cracking | % | 0 | 0 | 0 | 0 | 0 | 50 |
| Porosity | % | 55 | 55 | 57 | 55 | 45 | 55 |
| Electric resistance | $m\Omega \cdot dm^2$/sheet | 1.8 | 1.9 | 1.5 | 1.4 | 2.5 | 1.3 |
| Initial coulombic efficiency | % | 75 | 76 | 78 | 80 | 85 | 85 |
| Coulombic efficiency after the fiftieth charge and discharge cycle | % | 71 | 70 | 70 | 70 | 68 | 64 |
| Retainability of the initial coulombic efficiency | % | 95 | 92 | 90 | 88 | 80 | 75 |

INDUSTRIAL APPLICABILITY

According to the present invention, there can be obtained a separator for use in zinc/bromine secondary batteries which is excellent in thermal resistance, resistance to stress-cracking, electric properties, and the retainability of initial coulombic efficiency.

The invention claimed is:

1. A separator for use in zinc/bromine secondary batteries comprising a polyethylene having an overall viscosity average molecular weight of not less than 350,000 and not more than 2,000,000 containing not less than 10 wt. % and not more than 30 wt.% of a polyethylene having a molecular weight of 1,000,000 or more and fine particulate silica, wherein the ratio by weight of polyethylene/fine particulate silica is more than 1 and less than 1.5, and the ratio of the number of silicon atoms (Si) to the number of carbon atoms (C), Si/C, exposed on the surfaces of said separator excluding cross-sectioned surfaces thereof is not less than 0.01 and less than 0.2 as determined by X-ray photoelectron spectroscopy (XPS).

2. A process for producing a separator for use in zinc/bromine secondary batteries according to claim 1, comprising forming a sheet by knead-extrusion molding with a composition comprising polyethylene, fine particulate silica and a plasticizer at the ratio by weight of polyethylene/fine particulate silica of more than 1 and less than 1.5, and at a ratio by weight of plasticizer/fine particulate silica of not less than 2.51 and not more than 3.5, and then extracting said plasticizer.

3. The separator according to claim 1, wherein the ratio by weight of polyethylene/fine particulate silica is more than 1.05 and less than 1.20.

4. The process according to claim 2, wherein the ratio by weight of polyethylene/fine particulate silica is more than 1.05 and less than 1.20.

* * * * *

UNITED STATES PATENT AND TRADEMARK OFFICE
CERTIFICATE OF CORRECTION

PATENT NO. : 7,129,004 B2  Page 1 of 1
APPLICATION NO. : 10/283254
DATED : October 31, 2006
INVENTOR(S) : Yoshifumi Nishimura et al.

It is certified that error appears in the above-identified patent and that said Letters Patent is hereby corrected as shown below:

Col. 10, Claim 1, line 5, Please change: "30 wt.%" to --80 wt.%--.

Signed and Sealed this

Seventh Day of August, 2007

JON W. DUDAS
*Director of the United States Patent and Trademark Office*